United States Patent
Plüss et al.

(10) Patent No.: US 9,694,473 B2
(45) Date of Patent: Jul. 4, 2017

(54) METHOD AND DEVICE FOR MACHINING A ROTARY TOOL WITH A PLURALITY OF CUTTING BODIES

(75) Inventors: Christoph Plüss, Burgdorf Burgdorf (CH); Heinrich Mushardt, Börnsen (DE); Oliver Wenke, Neustadt (DE)

(73) Assignee: WALTER MASCHINENBAU GMBH, Tuebingen (DE)

( * ) Notice: Subject to any disclaimer, the term of this patent is extended or adjusted under 35 U.S.C. 154(b) by 601 days.

(21) Appl. No.: 14/352,756

(22) PCT Filed: Oct. 19, 2011

(86) PCT No.: PCT/EP2011/068281
§ 371 (c)(1),
(2), (4) Date: Oct. 10, 2014

(87) PCT Pub. No.: WO2013/056736
PCT Pub. Date: Apr. 25, 2013

(65) Prior Publication Data
US 2015/0028007 A1 Jan. 29, 2015

(51) Int. Cl.
*B24B 53/00* (2006.01)
*B24B 53/06* (2006.01)
(Continued)

(52) U.S. Cl.
CPC .............. *B24B 53/06* (2013.01); *B23K 26/08* (2013.01); *B23K 26/0823* (2013.01);
(Continued)

(58) Field of Classification Search
CPC .. B23K 26/0823; B23K 26/40; B23K 26/032; B24B 49/02; B24B 49/04; B24B 49/045; B24B 49/12; B24B 49/18; B24B 51/00
See application file for complete search history.

(56) References Cited

U.S. PATENT DOCUMENTS

| | | | | |
|---|---|---|---|---|
| 4,533,812 A | * | 8/1985 | Lorenz | B23F 21/02 219/121.19 |
| 6,565,417 B2 | * | 5/2003 | Kase | B24B 49/04 451/21 |

(Continued)

FOREIGN PATENT DOCUMENTS

| | | |
|---|---|---|
| CN | 1915597 A | 2/2007 |
| DE | 3202697 A | 8/1983 |

(Continued)

OTHER PUBLICATIONS

Office action and search report in corresponding Chinese Application No. 201180074285.8, dated Nov. 6, 2015, 10 pages.

(Continued)

*Primary Examiner* — Timothy V Eley
(74) *Attorney, Agent, or Firm* — Fitch, Even, Tabin & Flannery LLP

(57) ABSTRACT

A rotary tool (21) working surface (23) includes a plurality of cutting bodies (24). The rotary tool (21) can be driven about a rotational axis (R). The actual enveloping surface (HF) of the working surface (23) is ascertained by an optical measuring arrangement (29). At least one other target variable (GS) is detected, which describes a microscopic parameter of the working surface (23). The actual variable (GI) corresponding to each specified target variable (GS) is detected by the measuring arrangement (29), and the deviation between the target variable (GS) and the actual variable (GI) is determined. If the actual enveloping surface (HF) lies outside of a specified target enveloping area (HR) or if a deviation (D) between an actual variable (GI) and the corresponding target variable (GS) is unacceptably large, selected first and/or second cutting bodies (24a, 24b) are machined and/or removed by a laser device (35).

20 Claims, 8 Drawing Sheets

(51) Int. Cl.
*B23K 26/08* (2014.01)
*B24B 49/12* (2006.01)
*B23K 26/40* (2014.01)
*B23K 103/16* (2006.01)
*B23K 103/00* (2006.01)

(52) U.S. Cl.
CPC .............. *B23K 26/40* (2013.01); *B24B 49/12* (2013.01); *B24B 53/00* (2013.01); *B23K 2203/16* (2013.01); *B23K 2203/50* (2015.10)

(56) References Cited

U.S. PATENT DOCUMENTS

| | | | |
|---|---|---|---|
| 6,793,562 B2 * | 9/2004 | Gunjima | B23K 26/0078 451/5 |
| 7,572,174 B2 * | 8/2009 | Morita | B24D 18/00 451/443 |
| 8,125,654 B2 * | 2/2012 | Benvegnu | B24B 37/013 356/630 |
| 8,403,725 B2 * | 3/2013 | Honegger | B23Q 17/2419 451/10 |
| 8,790,157 B2 * | 7/2014 | Honegger | B23Q 17/2419 451/10 |
| 2004/0142644 A1 | 7/2004 | Gunjima et al. | |
| 2008/0014836 A1 * | 1/2008 | Meusburger | B24B 19/125 451/5 |
| 2014/0291307 A1 * | 10/2014 | Saegmueller | B23K 26/0823 219/121.72 |
| 2015/0343598 A1 * | 12/2015 | Ebina | B24B 49/04 700/164 |

FOREIGN PATENT DOCUMENTS

| | | |
|---|---|---|
| EP | 0716899 A1 | 6/1996 |
| GB | 2113583 A | 8/1983 |
| JP | S6179566 A | 4/1986 |
| JP | S61103776 A | 5/1986 |
| JP | H01271173 A | 10/1989 |
| JP | 2002321155 A | 11/2002 |
| JP | 2007276034 A | 10/2007 |

OTHER PUBLICATIONS

Second office action in corresponding Chinese Application No. 201180074285.8, dated Jun. 23, 2016, 11 pages.
Office action in corresponding Japanese Application No. 2014-536118, dated Mar. 25, 2016, 6 pages.
International Search Report of PCT/EP2011/068281 dated Sep. 11, 2012.

* cited by examiner

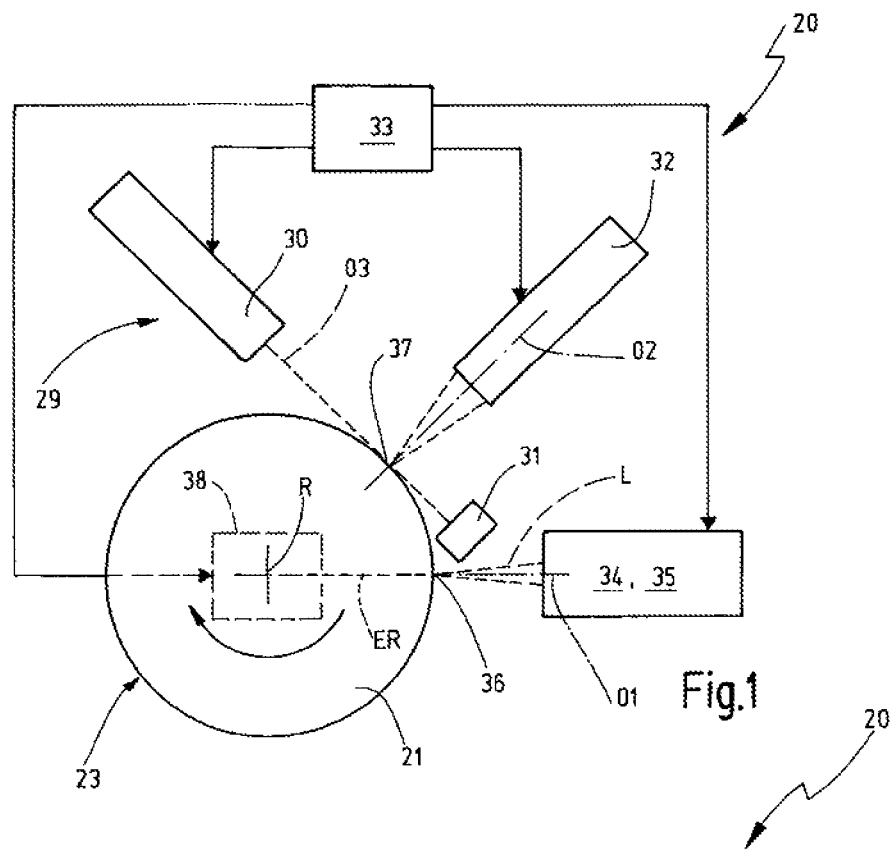
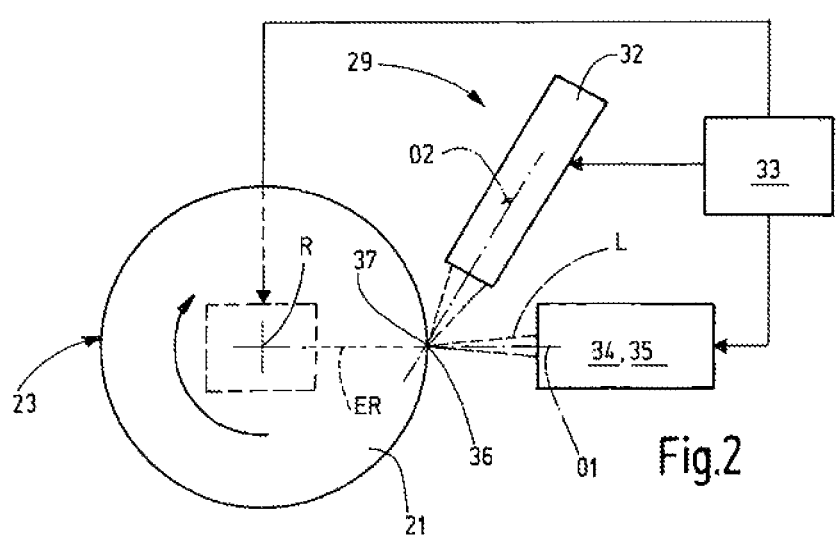

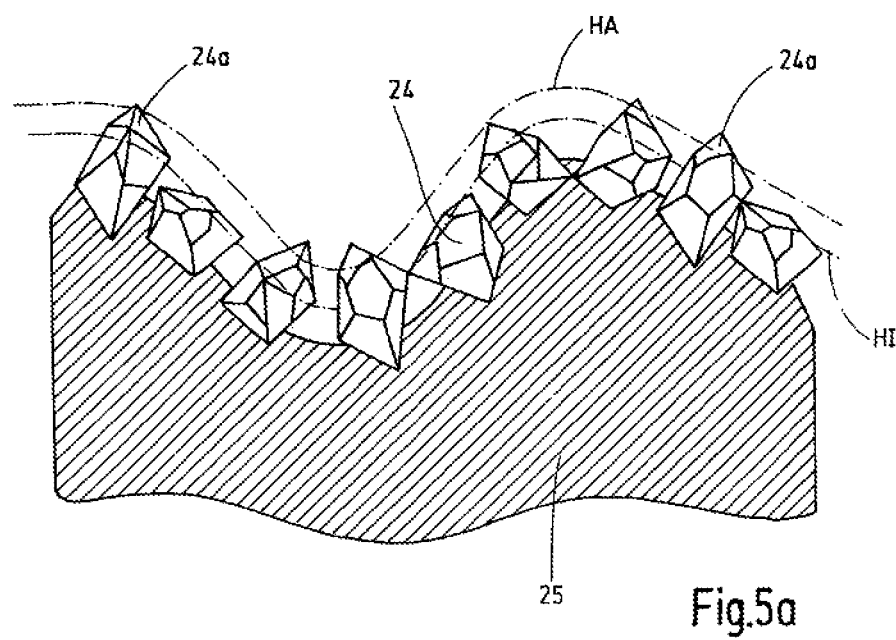
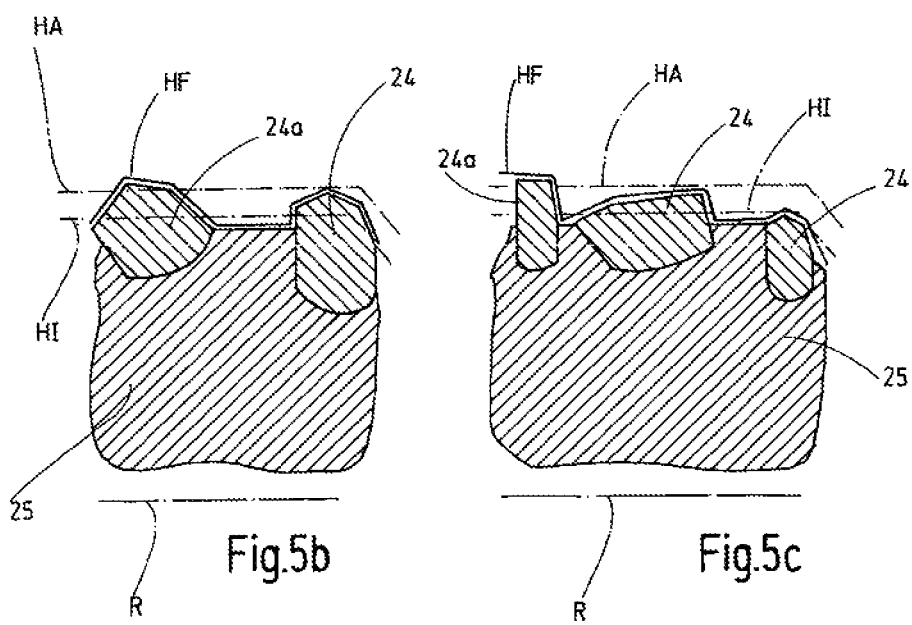

METHOD AND DEVICE FOR MACHINING A ROTARY TOOL WITH A PLURALITY OF CUTTING BODIES

CROSS REFERENCE TO RELATED APPLICATIONS

This patent application is the national phase of PCT/EP2011/068281 filed Oct. 19, 2011, which is incorporated by reference as if fully re-written herein.

TECHNICAL FIELD

The invention relates to a method as well as to a device for machining a rotary tool with a plurality of cutting bodies.

BACKGROUND

The rotary tool can be driven so as to rotate about a rotational axis and encompasses a cutting area, which is formed by the cutting bodies and which is geometrically undefined, or a geometrically defined tool blade. The rotary tool comprising cutting bodies, which form a geometrically undefined blade area, can be a grinding wheel or a dressing tool, for example. Tools, the cutting bodies of which form a geometrically defined tool blade, are milling, drilling or grinding tools, for example.

In particular in the case of precision tools, it is important that a highly accurate profile and a highly accurate concentricity or axial run-out, respectively, of the rotary tool, is attained. Due to the fact that machining accuracies of a few micrometers are to be reached by means of the tool, the appearance of wear or an inaccurate production of the rotary tool can lead to inadmissible tolerance deviations. The accurate production or finishing of the rotary tool is difficult, in particular when the cutting bodies consist of a very hard material or encompass a very hard outer wear-resistant layer, for example if materials, such as cubic crystalline boron nitride, diamond, polycrystalline diamond (PCD) or diamond layers, which are removed in the CVD process (chemical-vapor-deposition method), are used. Such cutting bodies are expensive and the finishing is time-consuming and cost-extensive, so that the machining of the rotary tool is to take place with a material usage of the cutting bodies, which is as low as possible. On the other hand, however, the target dimensions of the rotary tool must be reached.

DE 32 02 697 C2 proposes the use of an electron or laser beam, which is oriented tangentially to the outer surface of the tool, for machining a rotary tool. Crystal tips of the cutting bodies, which stick out from a specified target enveloping area, which specifies the outer contour of the rotary tool, are cut off. The rotary tool is rotated for this purpose, while the laser beam moves along the cross sectional contour, so that the rotary tool is to finally obtain the desired contour.

It turned out, however, that a tangential focusing of the laser beam towards a rotating rotary tool is unsuitable for the machining thereof, because the laser beam can only be focused at a certain point. Due to the fact that the laser beam must move along the entire tool contour in this manner, the method is furthermore extremely time-consuming. The rotary tool is furthermore machined only with reference to its contour. In addition, cutting off the tips of the cutting bodies, which stick out from the target enveloping area, creates relatively large tangential surfaces, which reduce the cutting effect of the rotary tool.

A further known possibility for finishing a rotary tool, which is used for grinding, is the so-called "crushing". In response to the crushing, the working surface, which is provided with the cutting bodies, is machined two-dimensionally by means of a tool, so as to adapt the actual enveloping surface to the target enveloping area. In the area of the machined surface, cutting bodies are thereby broken out of the binding material by means of a crushing tool. This method, however, is limited to the accuracy of the crushing tool and is not suitable for all types of the rotary tools, which are to be machined. In addition, the crushing requires a porous or rough binding material, because the cutting bodies can otherwise not be broken out. It cannot be used in many cases.

Known abrasive methods for sharpening or finishing such a rotary tools also have the disadvantage that the sharp tips and edges of the cutting bodies are removed and that the cutting effect of the rotary tool is therefore influenced negatively.

SUMMARY

Based on this, it can be considered to be a task of the instant invention to create an efficient, material-saving machining method as well as a device for carrying out the method, which avoids a negative impact of the cutting or engagement characteristics, respectively, of the at least one tool blade in response to the adaptation of the outer contour to the target contour.

Contrary to the currently used methods, the machining of the rotary tool is to take space systematically at individual cutting bodies, which are identified by a measuring process, and not at complete surface sections of the rotary tool, at which a part, but not all of the cutting bodies encompasses a position or a shape outside of specified tolerances.

According to the invention, a target enveloping area is initially specified for the rotary tool about the rotational axis of the rotary tool. This target enveloping area can be defined by an inner target enveloping surface and an outer target enveloping surface, for example, and describes the area around the tool axis, in which the active blades of the cutting bodies, which come in contact with the workpiece in response to the machining of a workpiece, are to be located. The target enveloping area is rotationally symmetrical as compared to the rotational axis of the rotary tool. Those cutting bodies, which project through the target enveloping area and out of the latter, represent first cutting bodies, which are to be machined or removed.

In addition to the target enveloping area, at least one further target variable is specified, which is to determine the cutting characteristic of the rotary tool. This at least one further target variable describes a characteristic of an individual cutting body and/or of a group of cutting bodies, wherein the group of cutting bodies can also comprise all of the cutting bodies. The at least one target variable characterizes the cutting characteristic of the rotary tool and characterizes for example the shape of a cutting body or of the group of cutting bodies, respectively, and/or the relative position of the cutting bodies or of the blades of the cutting bodies of a group of cutting bodies, wherein the target variable can also be a statistical variable.

While the target enveloping area specifies a macroscopic characteristic of the rotary tool, the at least one target variable defines a microscopic characteristic of the tool blade, which is formed by the cutting bodies. For example, one or a plurality of the following parameters can be used as target variable:

(1) The size of a contact surface of a cutting body, which is assigned to a machined workpiece in response to the use of the rotary tool and which rests against it in particular. The smaller the contact surface of a cutting body, the sharper the cutting body and the better the cutting body engages with the material of the workpiece in response to the use of the rotary tool.

(2) The distance between two adjacent cutting bodies, which engage with the target enveloping area, or the blades thereof. A minimum distance between the adjacent cutting bodies or blades, as well as an average distance of a group of cutting bodies or cutting body blades can be specified as target variable.

(3) The number of the cutting body blades, which engages with the target enveloping area. This number can also be based on a specified surface unit and can therefore quasi describe the density of the blades, thus for example the number of the blades for each square millimeter.

(4) The length of a blade of a cutting body or a statistical length value of the blades, based on a group of cutting bodies.

(5) The total contact surface of a group of cutting bodies, wherein the total contact surface is the sum of the contact surfaces of the considered cutting bodies. The surface of a cutting body, with which the cutting body can come to rest against a machined workpiece in response to the use of the rotary tool, is understood to be the contact surface. The larger the total contact surface, the less sharp the rotary tool.

(6) The height of a cutting body or a statistical height value of a group of cutting bodies. The height of a cutting body is thereby measured based on the binding material, which envelopes the cutting body. The binding material serves the purpose of binding the cutting bodies to one another. Based on the binding material, the height is measured up to the location of the cutting body, which is farthest away from the rotational axis, thus up to the radially outermost location of the cutting body.

(7) A geometric parameter of a cutting body, which determines the cutting characteristics, such as the angle of a cutting edge, for example, as compared to a reference line or reference surface, the radius of a cutting edge, the length of a cutting edge, etc.

An assigned actual variable of a cutting body and/or of a group of cutting bodies is in each case measured and/or determined for each specified target variable. An in particular optical measuring arrangement of the device serves this purpose. The deviation between the specified target variable and the corresponding determined actual variable is determined subsequently.

In the event that the deviation between a specified target variable and the assigned actual variable is larger than a specified tolerance, second cutting bodies are also identified and selected, which are machined or removed so as to reduce the deviation. In addition to the first cutting bodies, the second cutting bodies are subsequently also machined and/or removed in this case.

Individual first and also second cutting bodies can therefore be identified and machined or removed systematically. On the one hand, it is attained through this that the actual enveloping surface of the rotary tool lies within the specified target enveloping area. At the same time, it is possible to also positively impact the cutting effect of the rotary tool by considering the target variable in response to the machining.

By systematically selecting individual, first and second cutting bodies, if applicable, wherein only said first or second cutting bodies, respectively, are machined or removed, it is furthermore ensured that the rotary tool can be machined within a relatively short period of time, so as to attain the desired shape and the desired characteristics. In addition, only little material of the rotary tool is removed. As a whole, the machining according to the invention is thus extremely economical.

Preferably, the machining or the removal of a cutting body, respectively, takes place with the help of a laser beam. The laser beam is oriented at an acute angle of preferably less than 45° and in particular less than 30° relative to a radial plane, which runs through the rotational axis of the rotary tool and through the machining location on the working surface of the rotary tool, towards which the laser beam is focused. Such an orientated of the laser beam ensures that large contact surfaces, which would blunt the rotary tool, are not created at a cutting body in response to the machining.

Determining the actual enveloping surface of the tool and/or of the at least one actual variable as well as the subsequent machining and/or removing of individual cutting bodies takes place cyclically, until the rotary tool encompasses the desired characteristics. This cyclical machining is advantageous, because, in particular when using a laser beam, it cannot be predicted accurately, how much material will be removed from the cutting body or from the binding material, respectively, in response to a laser beam pulse. This is why it is advantageous to check the machining result again in a cyclical process and, if applicable, to carry out a further systematic machining or removal of individual cutting bodies, which were determined previously.

Preferably, a contact-free measuring arrangement is used for measuring the actual enveloping surface as well as the at least one actual variable. The contact-free measuring arrangement can be embodied as optical measuring arrangement. In the case of a preferred exemplary embodiment, the contact-free measuring arrangement encompasses an incident light measuring device. In addition or also in the alternative, a transmitted light measuring device can be present, which comprises a transmitter and a receiver located opposite the transmitter, and which provides in particular for a quick actual enveloping surface determination. In particular, the incident light measuring device and the transmitted light measuring device are focused towards the same measuring location on the rotary tool. In the case of an advantageous embodiment, the machining location, towards which the laser beam is focused, is spaced apart from the measuring location. In a manner of speaking, this results in a spatially offset measuring and machining.

As a variation to this, it would also be possible to focus the laser beam towards the measuring location, so that the measuring location and the machining location coincide. In the case of this arrangement, operation is carried out in time intervals. Measuring is carried out initially, one or a plurality of laser beam pulses are created subsequently. Measuring is then carried out again after the laser has been turned off, etc.

The transmitted light measuring device for detecting the actual enveloping surface can encompass a laser scanner, a line scan camera or a matrix camera comprising a transmitted light illumination or other suitable optical sensors (e.g. a so-called "position sensitive device").

The incident light measuring device can encompasses a line scan camera or a matrix camera and preferably uses diffuse and/or substantially monochromatic incident light. Other suitable sensors and methods, for example a stripe projection sensor or also a distance sensor—such as a laser triangulation sensor, e.g.—can be used, depending on the requirement.

Advantageous embodiments of the invention follow from the description. The description is limited to significant features of the invention as well as to other conditions. The drawing is to be used in a supplementary manner.

BRIEF DESCRIPTION OF THE DRAWINGS

FIG. 1 shows a block diagrammatic illustration of a first exemplary embodiment of a device for machining a rotary tool, FIG. 2 shows a block diagrammatic illustration of a second exemplary embodiment of a device for machining a rotary tool, FIG. 5a shows a further exemplary schematic detail illustration of an edge area of a rotary tool comprising a waved working surface in radial section, FIG. 5b shows a radial section through the rotary tool according to FIG. 1 according to sectional plane C1, FIG. 5c shows a radial section through the rotary tool according to FIG. 1 according to sectional plane C2.

DETAILED DESCRIPTION

Figure 10:
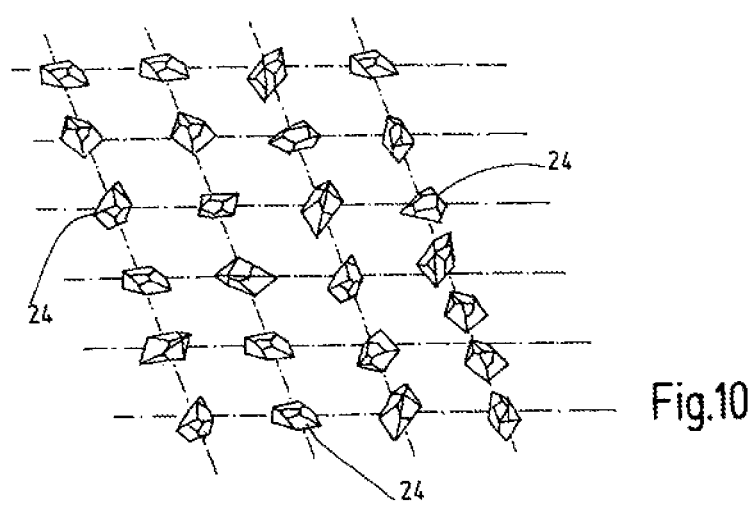
FIG. 10 shows an alternative arrangement possibility of the cutting bodies of the rotary tool according to a specified pattern.
Figure 11:
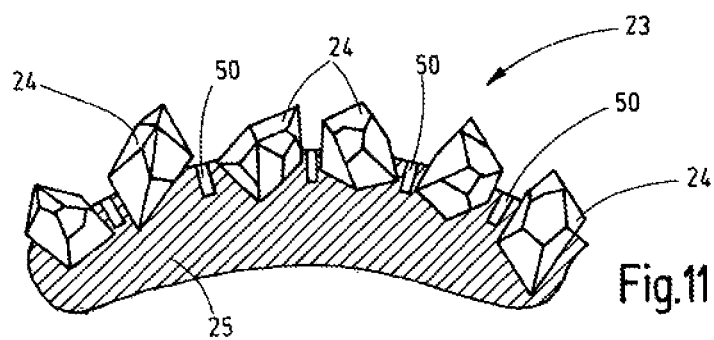
FIG. 11 shows a schematic, partially sectional detail illustration of an outer area of the rotary tool, wherein depressions are introduced between the cutting bodies to improve the coolant discharge.

The invention relates to a device 20 for machining a rotary tool 21 as well as to a method 22, for the machining thereof. The rotary tool 21 is a tool for machining. The rotary tool 21 can be driven so as to rotate about a rotational axis R. At its circumference, the rotary tool 21 encompasses a working surface 23, at which provision is made for at least one tool blade, which can be driven so as to rotate about the rotational axis R. According to the example, a plurality of cutting bodies 24, which in each case comprise one or a plurality of cutting body blades 43, forms a geometrically undefined cutting area. The cutting bodies 24 can be arranged so as to be distributed statistically in the area of the working surface 23 of the rotary tool 21. In the alternative, it is also possible to place the cutting bodies 24 at accurately specified positions, as it is illustrated in FIG. 10 or in FIGS. 12 to 14. The engagement profiles of the cutting bodies 24 overlap or intersect one another in response to the rotation of the rotary tool 21 and thus define the tool profile. This is illustrated in FIG. 14 for the exemplary embodiment of the cutting bodies 24, which are placed in a defined manner. Preferably, the cutting bodies 24 are formed by cutting crystals, so that the cutting bodies 24 differ from one another. However, it is also possible to give each cutting body 24 a desired shape, as it is shown in an exemplary manner in FIGS. 12 and 13.

As an alternative to the preferred exemplary embodiment described herein, the cutting bodies 24 can also form one or a plurality of geometrically defined blades on the rotary tool 21.

The cutting bodies consist of a hard and robust material or encompass at least a wear-resistant layer made of this hard material. For example, crystalline boron nitride, diamond or polycrystalline diamond (PCD) can be used as material. The wear-resistant layer can be applied via a CVD process (chemical-vapor-deposition method), for example, and can consist of diamond.

The cutting bodies 24 are held on the rotary tool 21 by means of a support or binding material 25. For example, the binding material can be formed by a synthetic resin. It is also possible to connect the cutting bodies 24 and the binding material 25 to one another by means of sintering, wherein metal dust, for example, is used as binding material 25. In addition, the cutting bodies 24 can be connected to one another galvanically, e.g. via a nickel compound as binding material 25.

The rotary tool 21 is preferably a grinding tool or a dressing tool. A particularly high shape accuracy is required in the case of these tool types, so as to later obtain the desired machining accuracy on a workpiece in response to the use of the rotary tool 21. Deviations in the concentricity or in the axial run-out, respectively, of the rotary tool 21, can thus only be permitted within very narrow tolerance limits. The machining method according to the invention or the device 20 according to the invention, respectively, can be used to establish the desired accuracy of the rotary tool 21. In addition, the invention can be used to finish the rotary tool 21 or to eliminate wear, respectively, and to reestablish a required sharpness or cutting characteristic. The invention can be used to machine the rotary tool 21 in a material-saving and efficient manner and can therefore be carried out highly economically.

The device 20 encompasses a measuring arrangement 29, which, in the case of the first exemplary embodiment according to FIG. 1, comprises a transmitted light measuring device 30 comprising a transmitted light camera 31 as well as an incident light measuring device 32. The measuring arrangement 29 or the measuring devices 30, 32, respectively, are controlled by a control device 33. The measuring arrangement 29 serves the purpose of measuring the rotary tool 21.

The device 20 also includes a machining device 34, which, in the case of the exemplary embodiment, is formed by a laser device 35. The machining device 34 and the laser device 35, for example, serves the purpose of machining the rotary tool 21 at locations of the working surface 23, which are defined accurately by means of the measuring arrangement 28, so as to eliminate deviations determined between the desired shape and/or characteristic of the working surface 23 or the cutting bodies 24, respectively. For this purpose, the laser device 35 creates a laser beam L, which is preferably pulsed and which is focused towards a machining location 36. Individual cutting bodies 24, which have been identified ahead of time, are machined systematically at this machining location 36. In addition, the binding material 25 between the cutting bodies 24 can be machined.

The machining location 36 of the laser device 35 is located on an optical axis O1 of the laser device 35. This optical axis O1 of the laser device 35 draws an acute angle, which is in particular less than 45° and, in the exemplary embodiment, less than 30°, with a radial plane ER, which runs through the rotational axis R of the rotary tool 21 and through the machining location 36. This angle can be constant or can change during the machining. According to FIGS. 1 and 2, the optical axis O1 of the laser device 35 is oriented radially to the rotational axis R and is thus located within the radial plane ER.

In the case of the first exemplary embodiment, the machining location 36 is located offset to a measuring location 37, at which the measuring is carried out by means of the measuring arrangement 29 at the working surface 23 of the rotary tool 21. The transmitted light measuring device 30 as well as the incident light measuring device 32 are oriented towards the same measuring location 37 at the working surface 23, wherein, as a variation, the measuring devices 30, 32 could also encompass measuring locations, which are spaced apart from one another. In the case of the first exemplary embodiment according to FIG. 1, the optical axis O2 of the incident light measuring device 32 is oriented radially to the rotational axis R of the rotary tool 21. The optical axis O3 of the transmitted light measuring device 30 is oriented so as to be substantially at right angles to the optical axis O2 of the incident light measuring device 32, so that the optical axis O3 of the transmitted light measuring device 30 runs approximately tangentially to the working surface 23. The transmitted light camera 31 is arranged along the optical axis O3 of the transmitted light measuring device 30 on the one side and a light source is arranged on the opposite side.

The device 20 furthermore encompasses a drive device 38, which is controlled by means of the control unit 33. The drive device 38 serves the purpose of rotating the rotary tool 21 during the machining about the rotational axis R and/or to displace it linearly along the rotational axis. Via the measuring arrangement 29, for example viewed parallel to the rotational axis R, only a certain measuring section can be detected, which can lie within the range of several millimeters. For example, a matrix camera as transmitted light camera 31 can detect a range of between approximately 3 mm and 6 mm, which, however, also depends on the resolution of the transmitted light camera 31. In the event that the direction of extension of the working surface 23 parallel to the rotational axis R is larger than the detection area of the measuring arrangement 29, a plurality of measurements, which can subsequently be associated with one another or which can be evaluated, respectively, in the measuring arrangement 29 and/or in the control device 33, are carried out so as to be offset axially parallel to the rotational axis R.

As is illustrated in FIGS. 1 and 2, the control device 33 also serves to control the machining device 24 and the laser device 35 according to the example. By measuring with the help of the measuring arrangement 29, those cutting bodies 24, which are to be machined or removed, respectively, are identified. The control device 33 controls the drive device 38 and the machining device 34 or the laser device 35, respectively, so as to machine or remove, respectively, the cutting bodies 24, which have been identified for being machined or removed, respectively, accordingly. The laser device 35 preferably creates a pulsed laser beam L. It can encompass optical means for focusing and/or orienting the laser beam L, so that the optical axis O1 of the laser device 35 and therefore also the machining location 36 can be moved by means of optical means of the laser device 35.

In contrast to the first exemplary embodiment according to FIG. 1, provision is not made for a transmitted light measuring device 30 in the case of the second exemplary embodiment according to FIG. 2. The measuring arrangement 29 only encompasses an incident light measuring device 32. The optical axis O2 thereof does not intersect the rotational axis R. The optical axis O2 of the incident light measuring device 32 is oriented diagonally to a tangent towards the measuring location 36 and diagonally to a radial plane through the measuring location 37 and the rotational axis R. The actual enveloping surface HF of the rotary tool 21, which is defined by means of the cutting bodies 24, which are arranged at the working surface 23, as well as geometric characteristics of a cutting body 24 or geometric characteristics of a group of cutting bodies 24, respectively, can be determined by means of this orientation. In the case of the first exemplary embodiment according to FIG. 1, the transmitted light measuring device 30 is provided for detecting the actual enveloping surface HF of the rotary tool 21, while the determination of geometric characteristics of an individual cutting body 24 or of a group of cutting bodies 24 is made by means of the incident light measuring device 32.

In the case of the exemplary embodiment illustrated in FIG. 2, the measuring location 37 corresponds to the machining location 36. In the case of this embodiment, measuring and machining cannot be carried out simultaneously, because a high light intensity and a plasma cloud, which interfere with the optical measuring of the measuring arrangement 29, are created due to the incident laser beam L. Measuring is thus carried out in time intervals and material is machined by means of the laser beam L. Due to the fact that, in the case of the first embodiment according to FIG. 1, the measuring location 37 is spaced apart from the machining location 36, measuring can be carried out at the measuring location 37 and a machining of the rotary tool 21 can be carried out at the machining location 36 simultaneously.

It goes without saying that combinations of the two embodiments illustrated in FIGS. 1 and 2 are also possible. For instance, the optical axis O2 of the incident light measuring device 32 in the case of the first exemplary embodiment could also be oriented diagonally to the radial plane through the measuring location 37 and the rotational axis R. In addition, the machining location 36 and the measuring location 37 could also coincide in the case of the first exemplary embodiment.

Figure 3:
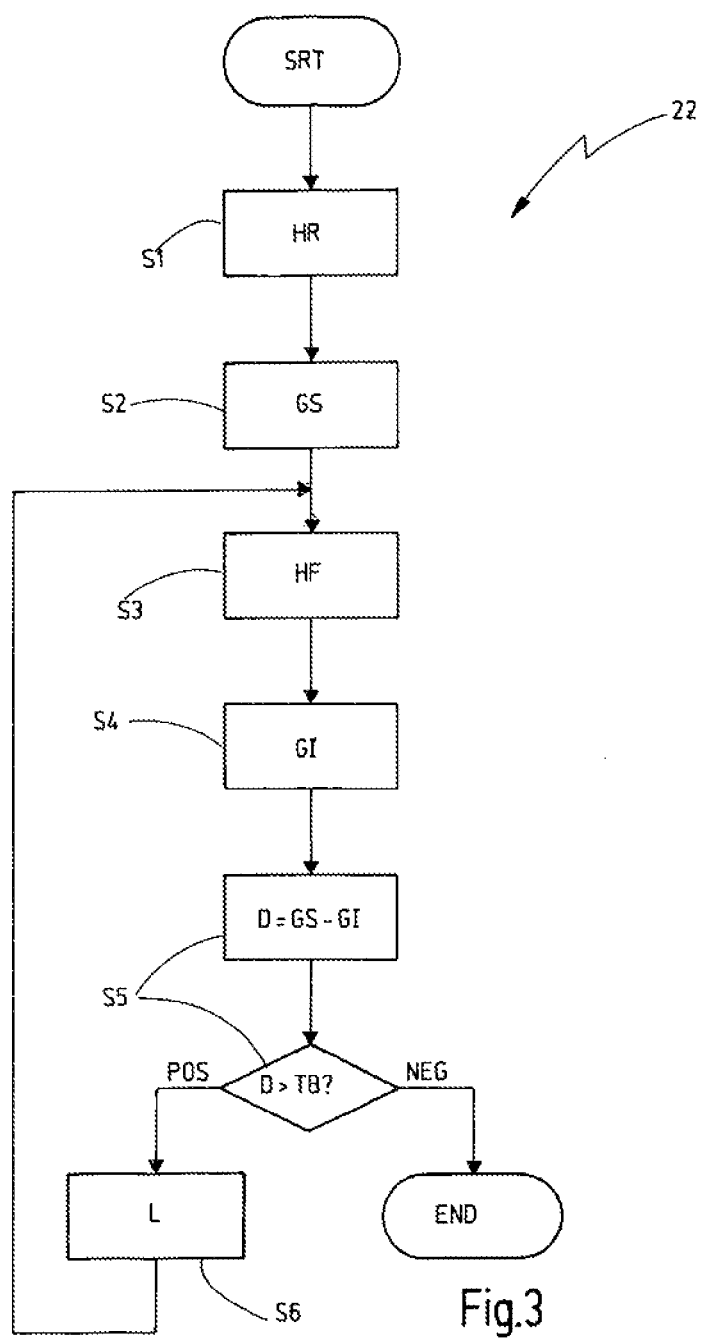
FIG. 3 shows a flow chart of an exemplary embodiment of a method according to the invention for machining a rotary tool.
Figure 4:
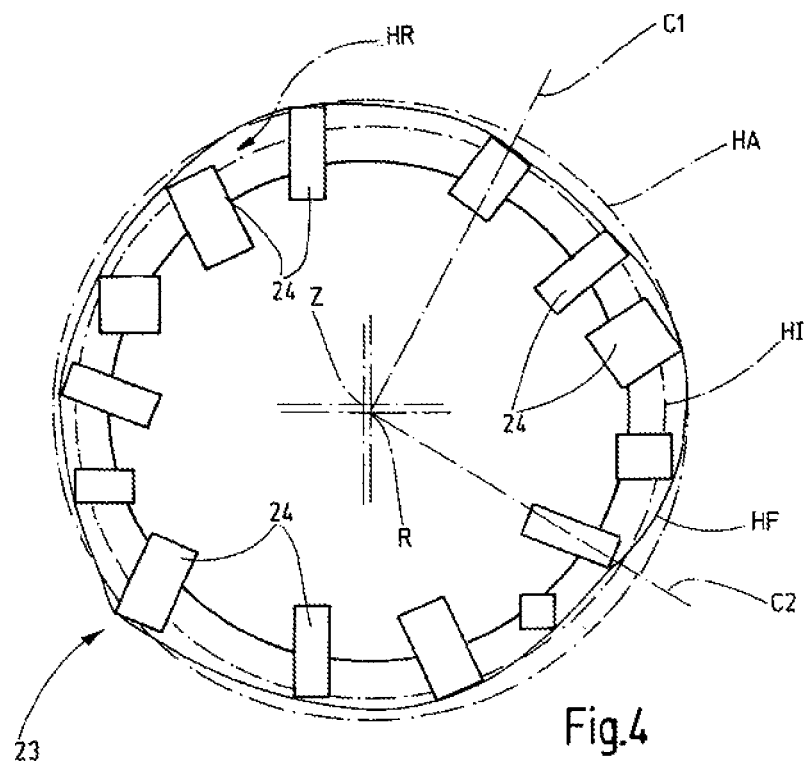
FIG. 4 shows a schematic illustration of an actual enveloping surface and of a target enveloping area for a cross sectional plane of a rotary tool.

FIG. 3 illustrates an exemplary process flow by means of a flow chart. The method 22 will be explained below in more detail by means of the flow chart as well as by means of the further FIGS. 4 to 13.

After the start SRT of the method 22, the target enveloping area HR is specified in a first method step S1. The target enveloping area HR is a rotationally symmetrical area or area around the rotational axis R of the rotary tool 21. According to the example, the target enveloping area HR is defined by means of a rotationally symmetrical inner enveloping surface HI and a rotationally symmetrical outer enveloping surface HA, as it is illustrated schematically in FIG. 4. In the event that the enveloping surface HF runs within the target enveloping area HR at every location, the outer shape or the contour, respectively, of the rotary tool 21 or of the working surface 23, respectively, corresponds to the specification. In the case of the example illustrated in FIG. 4, it can be seen that the actual enveloping surface HF runs outside of the target enveloping area HR at a plurality of locations. The geometric center Z of the rotary tool 21 thus also does not correspond to the rotational axis R, thus resulting in concentricity deviations. These deviations are eliminated subsequently by means of the method 22 according to the invention with the help of the device 20.

Figure 5:
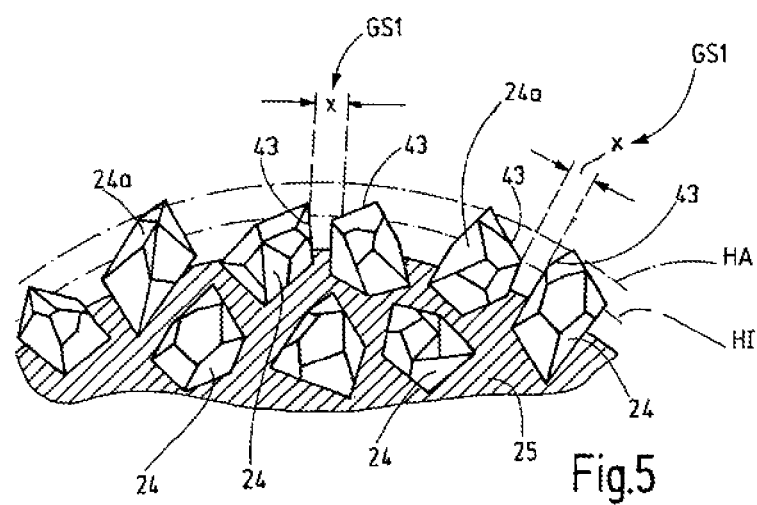
FIG. 5 shows an exemplary schematic detail illustration of the edge area of a rotary tool in radial section.

As is illustrated in FIGS. 5, 5a, 5b and 5c, the working surface 23 of the rotary tool 21, viewed in radial section, can encompass different shapes or contours, respectively. Viewed parallel to the rotational axis R, the enveloping area HR can run in a curved manner, for example (FIG. 5), can encompass a waved course (FIG. 5a) or also a course comprising bends and/or steps (FIGS. 5b, 5c). This depends on the type of the rotary tool and of the purpose thereof. Deviations of the actual enveloping surface HF from the target enveloping area HR can appear in circumferential direction or in rotational direction, respectively, of the rotary tool 21 and/or in the direction parallel to the rotational axis R.

Figure 6A:
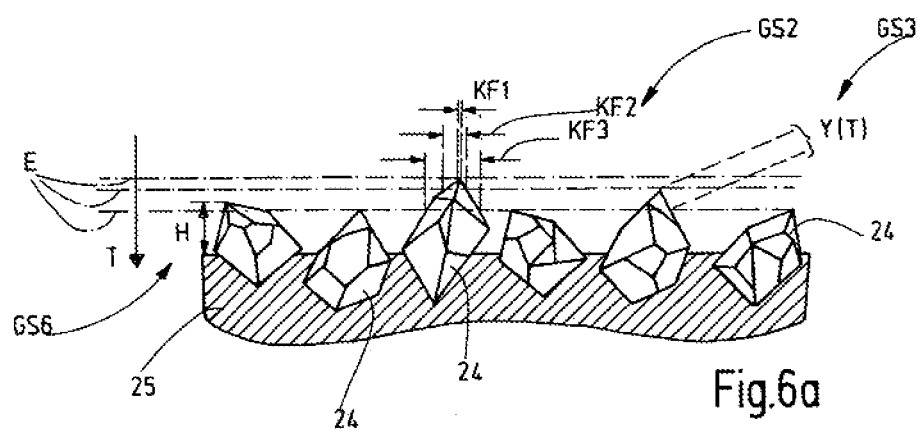
FIGS. 6a-6c show the context between the number of the cutting body blades as well as a total contact surface of the rotary tool, depending on a depth.
Figure 6B:
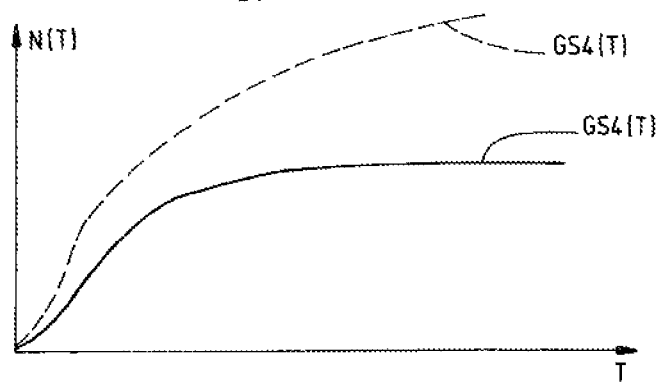
Figure 6C:
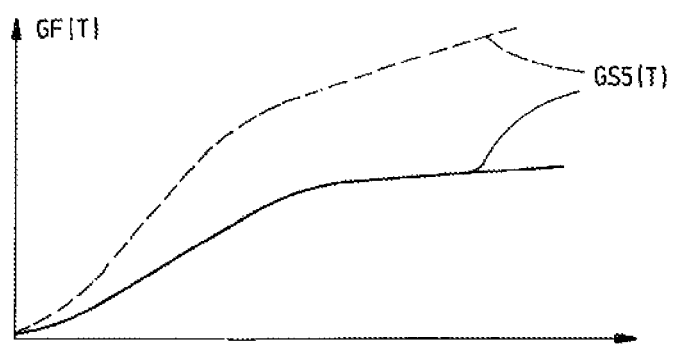
Figure 12:
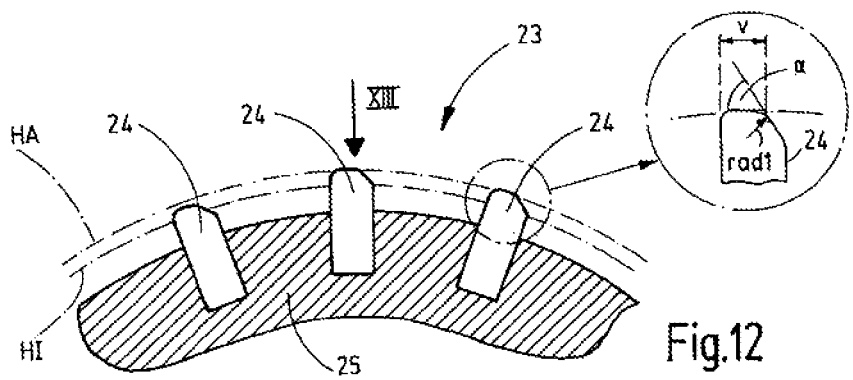
FIG. 12 shows a schematic, partially sectional detail illustration of a section of the rotary tool with an alternative embodiment of the cutting bodies and with geometrical parameters, which are specified in an exemplary manner.
Figure 13:
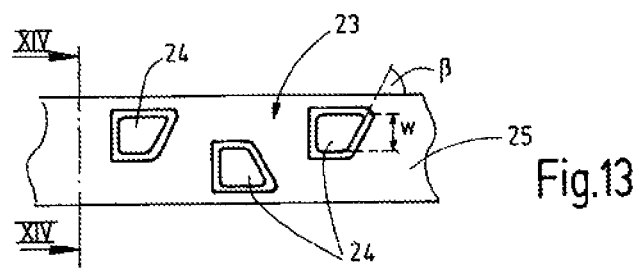
FIG. 13 shows a top view according to arrow XIII in FIG. 12 radially to the rotational axis of the rotary tool in the exemplary embodiment from FIG. 12 with further geometrical parameters, which are specified in an exemplary manner.
Figure 14:
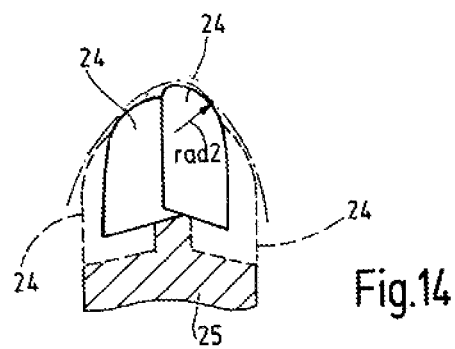
FIG. 14 shows a schematic illustration of the section of the rotary tool from FIGS. 12 and 13 in a radial section according to sectional line XIV-XIV in FIG. 13.

In addition to the target enveloping area HR, at least one further target variable GS is specified according to the example in a second method step S2. While the target enveloping area HR specifies the macroscopic shape of the rotary tool 21 or of the working surface 23, respectively, the at least one additional target variable GS characterizes the microscopic design of the working surface 23. The at least one target variable GS describes in particular the cutting characteristic of the cutting bodies 24, which are arranged so as to be distributed along the working surface. In the case of the preferred exemplary embodiment, one or a plurality of the following variables is used as at least one target variable GS:

a) The minimum distance x of two cutting body blades 43 of adjacent cutting bodies 24 can be used as a first target variable GS1, wherein only such cutting body blades 43 are considered, for example, which run completely or partially within the target enveloping area HR. The minimum distance x can thus be the distance, at which the two cutting body blades 43 within the target enveloping area HR encompass the least distance relative to one another. A threshold value, which may not be fallen below (FIG. 5), can be specified as first target variable GS1 for the minimum distance x. This is so, because, in the event that the minimum distance x between two adjacent cutting body blades 43 becomes too small, the individual cutting body blades 43 cannot penetrate sufficiently well in response to engaging with a workpiece, which is to be machined, because the material displacement and the chip removal is hindered.

b) The size of the contact surface KF of a cutting body 24 can serve as a second target variable GS2. The contact surface KF is the cross sectional surface of a cutting body 24 located on an envelope E about the rotational axis R, which can come into contact with or rest against the workpiece, respectively, in response to the machining of a workpiece, depending on the wear of a cutting body 24. Generally, the contact surface KF will be measured independent from the current wear state on the envelope E and will be based thereon. The envelope E is a rotationally symmetrical surface about the rotational axis R and the shape thereof corresponds to the inner and the outer enveloping area HI, HA, wherein the distance to the rotational axis R can vary. The envelope can run within or outside of the target enveloping area. The distance thereof from the rotational axis is described by means of a depth T, for example. The smaller the distance of an envelope E to the rotational axis R, the larger a depth T (FIG. 6a). The contact surface KF is thus defined as a function of the depth T. Due to the fact that the cross section of the cutting bodies 24 increases from a cutting body blade or tip, which is oriented radially outwardly, the contact surface KF also increases as the depth T increases. The larger the contact surface KF, the less sharp a cutting body 24. The increase of the contact surface KF with increasing depth T is illustrated schematically in FIG. 6a for one of the cutting bodies, wherein the contact surface KF increases from a first surface value KF1 across a second surface value KF2 to a third surface value KF3. As second target variable GS2, a value or a value range can be specified for the contact surface size for one or a plurality of depths T. It is also possible to specify a function of the size of the contact surface KF of a cutting body 24 as a function of the depth T as second target value GS2.

c) As a third target variable GS3, the length y of a cutting body blade 43 of a cutting body 24 can be specified for one or a plurality of depth values or as function of the depth T (FIG. 6a), wherein preferably only the section of one cutting body blade 43 is considered, which is located within the target enveloping area HR.

d) As a fourth target variable GS4, the number N of the cutting body blades 43 can be specified for a plurality of specified depth values T or as a function of the depth T, as is illustrated schematically in FIG. 6b. The fourth target variable GS4 can encompass, for example, a lower threshold value (continuous line in FIG. 6b) and/or an upper threshold value (dashed line in FIG. 6b).

e) As fifth target variable GS5, the size of a total contact surface GF of a group comprising a plurality of cutting bodies 24 or all of the cutting bodies 24, respectively, can be specified for one or a plurality of depth values T or as a function, which depends on the depth T. The total contact surface GF is thereby the sum of the amounts of each contact surface KF, on the envelope E, which runs in the specified depth T. In the case of the total contact surface GF, it is thus not individual cutting bodies 24, which are considered, but the total contact surface GF is assigned to all of the cutting bodies 24 of the considered group of cutting bodies 24 or all of the cutting bodies 24, respectively, at the working surface 23. The fifth target variable GS5 can encompasses a lower threshold value (continuous line in FIG. 6c) and/or an upper threshold value (dashed line in FIG. 6c).

f) The height H of a cutting body 24 can be used as sixth target variable GS6. The height H can be measured, for example starting at the binding material 25, which surrounds the cutting body 24, to the location of the cutting body 24, which is located farthest away from the rotational axis R (FIG. 6a). The height H describes the maximum engagement depth of a cutting body 24 with the surface of a workpiece in response to the use of the rotary tool 21. For the height H, a minimum value and/or also a maximum value, e.g., can be specified as sixth target variable GS6.

g) At least one geometric parameter of a cutting body 24 can also be used as target variable, which is illustrated in an exemplary manner by means of FIGS. 12 to 14:

an angle $\alpha, \beta$ of a cutting body blade 43 relative to a reference line or a reference surface;

a radius rad1 or rad2 of a cutting body blade 43;

the width w or the length v of a cutting body blade 43 and/or of a surface of a cutting body 24.

In a third method step S3, the actual enveloping surface HF is determined with the help of the optical measuring arrangement 29 and, for example, with the help of the transmitted light measuring device 30. For this purpose, the drive device 38 moves the rotary tool 21 about the rotational axis R and, if applicable, successively also parallel to the rotational axis R, until the entire working surface 23 has been detected. In the measuring arrangement 29 or in the control device 33, respectively, the actual enveloping surface HF, which is determined by the position and location of all of the cutting bodies 24, can subsequently be formed from the individual measurements at the measuring location 37.

In a fourth method step S4, the shape or the design, respectively, of individual cutting bodies 24 is then detected by means of the optical measuring arrangement 29, for the purpose of which the incident light measuring device 32 is used according to the example. One or a plurality of actual variables GI is thereby determined. The actual values, for which a target variable GS is specified, are recorded as actual variables GI. The detection of the actual enveloping surface HF as well as of the at least one actual variable GI can be made successively. In the alternative, it is also possible to already determine the at least one actual variable GI during the detection of the actual enveloping surface HF.

Subsequent to the determination of the actual enveloping surface HF as well as of the at least one actual variable GI, those cutting bodies 24, which are to be machined or removed, are identified in a fifth method step S5.

Those cutting bodies 24, which project out of the outer target enveloping surface HF, are identified as first cutting bodies 24a (FIG. 5).

Those cutting bodies 24, which must be machined or removed so as to reduce a deviation D between a specified target variable GS and the corresponding actual variable GI, when it is determined that the deviation D is larger than an admissible tolerance range TB, which is assigned to the respective target variable GS, are identified as second cutting bodies 24b.

It goes without saying that the deviation D between a target variable GS and a corresponding actual variable GI can also be influenced in that the first cutting bodies 24a are machined and/or removed. This is considered in response to the determination of further, second cutting bodies 24b.

Figure 7A:
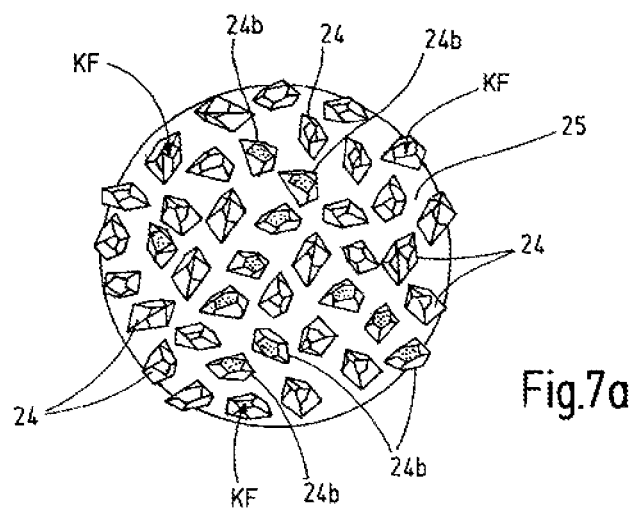
FIG. 7a shows a schematic top view onto a section of the working surface of the rotary tool, comprising a plurality of cutting bodies prior to the machining.
Figure 9A:
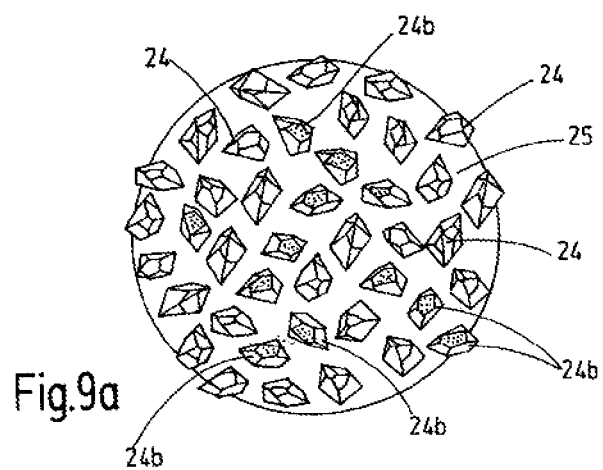
FIG. 9a shows a schematic top view onto a section of the working surface of the rotary tool comprising a plurality of cutting bodies in irregular distribution prior to the machining.
Figure 9B:
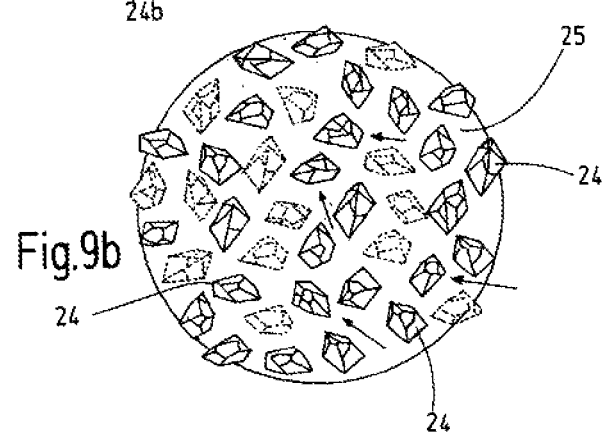
FIG. 9b shows the schematic illustration according to FIG. 9a, wherein a part of the cutting bodies was removed and another part of the cutting bodies was machined and the machined cutting bodies are marked by means of arrows.

Those second cutting bodies 24b, which must be machined or removed, so as to reduce a deviation, for example, so as to reduce the total contact surface GF, are illustrated in FIGS. 7a and 9a in a highly schematic and exemplary manner. A certain number of cutting bodies 24 was thus identified as second cutting bodies 24b, which encompass a relatively large contact surface KF, which is illustrated in a dotted manner in FIGS. 7a and 9a. For example, such cutting bodies 24, the contact surfaces KF of which are larger than a specified reference value, can be selected in this case as second cutting bodies 24b.

Figure 7B:
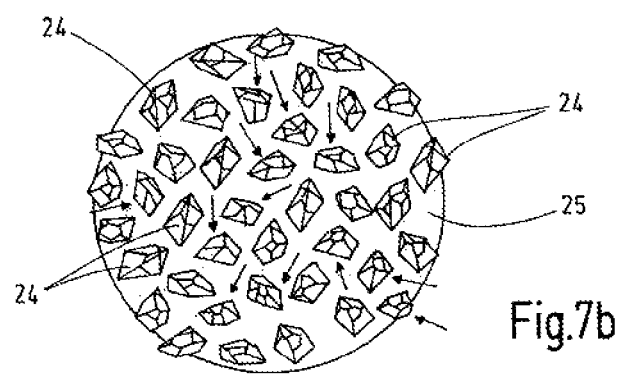
FIG. 7b shows the schematic illustration according to FIG. 7a after the machining, wherein the machined cutting bodies are marked by means of arrows.
Figure 8:
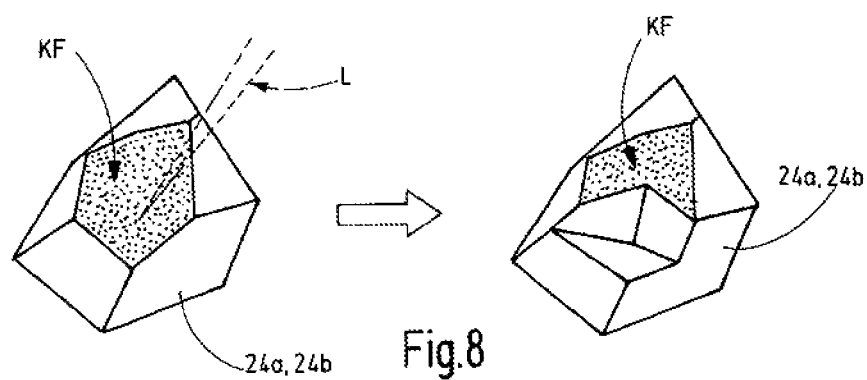
FIG. 8 shows an enlarged schematic and only exemplary illustration of the machining of a cutting body with the help of a laser beam.

In FIG. 7b, the second cutting bodies 24b, which have been machined for reducing the total contact surface GF, are marked by means of arrows. The machining of a first or second cutting body 24b is illustrated in FIG. 8 in a schematically enlarged manner. By directing a pulse of the laser beam L towards a defined location of the cutting body, a part of the cutting body is removed and evaporated according to the example. Parts, which project out of the target enveloping area HR, can thus be removed or the size of the contact surface KF thereof can be reduced.

It is also possible to completely remove cutting bodies 24, for example in the event that they have worn out to a very high extent due to wear or because the distance x between adjacent cutting body blades 43 or the density of the cutting body blades 43 is too large. This approach is illustrated schematically in FIGS. 9a and 9b. The cutting bodies 24, which are illustrated in a dotted manner in FIG. 9b, were removed. The cutting bodies 24, which are marked by means of arrows, were machined, for example so as to reduce the contact surface KF thereof. The first cutting bodies 24a can be machined as well as removed.

The machining of the first cutting bodies 24 and of the second cutting bodies 24b takes place in a sixth method step S6. This machining or removal, respectively, of the first and second cutting bodies 24a, 24b, is carried out, if either the actual enveloping surface HF is located outside of the target enveloping area HR, or if the deviation D between one of the specified target variables GS and the assigned actual variable GI lies outside of the tolerance range TB (branching POS from the fifth method step S5). Following the machining in the sixth method step S6, the method is continued again with the third and fourth method steps S3, S4 and the actual enveloping surface or the at least one actual variable GI, respectively, is determined. This is necessary, because it is not possible to accurately predict the impact of the focusing of a laser beam pulse L towards the working surface 23 in response to the laser machining of the working surface 23. This prediction is difficult, because the absorption characteristics of cutting body 24, for example, are completely different from the absorption characteristics of the binding material 25. Due to the fact that a further cutting body 24 can be arranged directly below the surface of the binding material in an inner position (see, for example, FIG. 5), an accurate prediction cannot be made, how deep the created crater is and whether a cutting body 24 could be loosened and removed by removing the binding material 25, for example when focusing the laser beam towards the binding material 25 between cutting bodies 24.

The method steps S3 to S6 are repeated until the deviation D for all of the specified target variables GS and for all of the respective assigned actual variables GI is smaller than the respective assigned tolerance range TB and when the actual enveloping surface HF is furthermore located within the target enveloping area HR. The method is then ended at END (branching NEG from the fifth method step S5).

In the sixth method step S6, the laser beam pulse L cannot only be focused directly towards a first cutting body 24a or second cutting body 24b, which is to be machined or removed, respectively. To influence the height H or also to remove a cutting body 24a, 24b, it is also possible, for example, to direct the laser beam pulse L towards the binding material 25 between the cutting bodies. In addition to the machining and/or removing of cutting bodies, depressions 50 can also be introduced into the working surface 23. Such depressions 50 can improve the discharge of coolant and the removal of chips in the area of the working surface 23. The cross sectional contour of such depressions 50 can be chosen arbitrarily. For example, it is possible to introduce chamfer-shaped depressions 50 into the working surface 23, as is illustrated schematically in FIG. 11 in an exemplary manner. The machining device 34, which is formed by means of the laser device 35, can be used for this purpose. Such depressions 50 can form grooves, which completely permeate the working surface 23, and can run crosswise, thus at right angles, or diagonally to the rotational direction about the rotational axis R.

The invention relates to a device 20 and to a method 22 for machining a working surface 23 of a rotary tool 21, which encompasses a plurality of cutting bodies 24. The rotary tool 21 can be driven about a rotational axis R. The cutting bodies 24 can form a geometrically defined or a geometrically undefined tool blade. They can be arranged so as to be distributed statistically on the working surface 23 or can be arranged in defined geometric positions. The actual enveloping surface HF of the working surface 23 is determined via an optical measuring arrangement 29. In addition, at least one further target variable GS can be detected, which describes a microscopic parameter of the working surface 23. For each specified target variable GS, the corresponding actual variable GI is detected via the measuring arrangement 29 and the deviation between target variable GS and actual variable GI is determined. In the event that the actual enveloping surface HF is located outside of a specified target enveloping area HR or in the event that a deviation D between an actual variable GI and the corresponding target variable GS is inadmissibly high, first and/or second cutting bodies 24a, 24b, which are selected via a laser device 35, are machined and/or removed. This method is carried out cyclically until the rotary tool 21 satisfies all of the specifications.

LIST OF REFERENCE NUMERALS 20 device
21 rotary tool
22 method
23 working surface
24 cutting body
25 binding material
29 measuring arrangement
30 transmitted light measuring device
31 transmitted light camera
32 incident light measuring device
33 control device
34 machining device
35 laser device
36 machining location
37 measuring location
38 drive device
43 cutting body blade
50 depression
E envelope
END end of the method
ER radial plane
GI actual variable
GS target variable
GS1 first target variable
GS2 second target variable
GS3 third target variable
GS4 fourth target variable
GS5 fifth target variable
GS6 sixth target variable
GF total contact surface
H height
HA outer target enveloping surface
HF actual enveloping surface
HI inner target enveloping surface
HR target enveloping area
KF contact surface
KF1 first value for the contact surface
KF2 second value for the contact surface
KF3 third value for the contact surface
L laser beam
O1 optical axis of the laser device
O2 optical axis of the incident light measuring device
O3 optical axis of the transmitted light measuring device
R rotational axis
rad radius
S1 first method step
S2 second method step
S3 third method step
S4 fourth method step
S5 fifth method step
SRT start of the method
T depth
v length
w width
x minimum distance
y length
Z center

The invention claimed is:

1. A method for machining a rotationally drivable rotary tool (21) comprising a plurality of cutting bodies (24), which form at least one tool blade or a cutting area, the method comprising:
   specifying a target enveloping area (HR) for the rotary tool (21) about a rotational axis (R) of the rotary tool (21),
   determining one or more first cutting bodies (24a), which are to be machined and/or removed, having a position or shape that lies outside of specified tolerances for position or shape,
   systematically machining and/or removing the first cutting bodies (24a) and second cutting bodies (24b).

2. The method according to claim 1 further comprising:
   specifying at least one target variable (GS), which determines a cutting characteristic of the rotary tool (21) and which characterizes an individual cutting body (24) and/or a group of cutting bodies (24),
   determining an actual variable (GI) to an individual corresponding target variable of the at least one target variable (GS) of an individual cutting body (24) and/or a group of cutting bodies (24),
   comparing the actual variable (GI) to the target variable (GS) and determining a deviation (D) between the actual variable (GI) and the corresponding target variable (GS),
   determining second cutting bodies (24b), which are to be machined and/or removed so as to reduce the deviation (D) of the actual variable (GI) from the corresponding target variable (GS) when the actual variable (GI) lies outside of an admissible tolerance range (TB), systematically machining and/or removing the second cutting bodies (24b).

3. The method according to claim 1, further comprising repeating cyclically:
determining whether the first cutting bodies (24a) and/or the second cutting bodies (24b), which are to be machined, are present and
machining and/or removing the first cutting bodies (24a) and the second cutting bodies (24b).

4. The method according to claim 1, wherein the machining and/or removing of the first cutting bodies (24a) and of the second cutting bodies (24b) comprises machining and/or removing of the first cutting bodies (24a) and of the second cutting bodies (24b) using a laser beam (L), which is directed and/or focused towards a location (36) of the working surface (23) of the rotary tool (21), which is to be machined.

5. The method according to claim 4, further comprising an optical axis (O1) of the laser beam (L) drawing an acute angle with a radial plane (ER), which runs through the rotational axis (R) of the rotary tool (21) and through the location (36) of the working surface to be machined.

6. The method according to claim 1, further comprising using a statistical variable, which is assigned to a group of cutting bodies (24), as a target variable (GS).

7. The method according to claim 1, further comprising specifying a rotationally symmetrical envelope (E) about the rotational axis (R), wherein the rotationally symmetrical envelope (E) comprises a variable distance from the rotational axis (R), which is described by a depth (T), and in that at least one of the specified target tolerances is specified as a function of the depth (T).

8. The method according to claim 1, further comprising using a size of a contact surface (KF) of a cutting body (24), which can come into contact with a machined workpiece in response to the use of the rotary tool (21), as a target variable (GS2).

9. The method according to claim 1, further comprising using a distance (x) between blades (43) of two adjacent cutting bodies (24) as a target variable (GS1).

10. The method according to claim 1, further comprising using a number (N) of the cutting bodies (24) or the number (N) of the blades (43) of the cutting bodies (24) as a target variable (GS4).

11. The method according to claim 1, further comprising using a length (y) of a blade (43) of a cutting body (24) or a length value of the blades (43) of a group of cutting bodies (24) as a target variable (GS3).

12. The method according to claim 1, further comprising using a total contact surface (GF) of a group of cutting bodies (24) as a target variable (GS5), wherein the total contact surface (GF) is a sum of contact surfaces (KF) of the group of cutting bodies (24) and the contact surface (KF) of a cutting body (24) of the group of cutting bodies is a surface, which can come into contact with a machined workpiece in response to use of the rotary tool (21).

13. The method according to claim 1, further comprising using a geometric parameter of a cutting body (24), which determines cutting characteristics for the cutting body (24), as a target variable (GS).

14. The method according to claim 1, further comprising using a height (H) of a cutting body (24) or a height value of a group of cutting bodies (24) as a target variable (GS6), wherein the height (H) is measured from an outer surface of a binding material (25) surrounding a respective cutting body (24) of the rotary tool (21) holding the cutting bodies (24) to a location of a cutting body (24) farthest away from a rotational axis (R) of the rotary tool (21).

15. The method according to claim 1, further comprising holding the cutting bodies (24) with at least one depression (50) in a binding material (25) of the rotary tool (21).

16. A device for machining a rotationally drivable rotary tool (21), which encompasses a plurality of cutting bodies (24), which form at least one tool blade or a cutting area, the device comprising:
a control device (33), which is set up to specify a target enveloping area (HR) for the rotary tool (21) about a rotational axis (R) of the rotary tool (21),
a measuring arrangement (29) configured to measure an actual enveloping surface (HF) of the rotary tool (21), wherein the measuring arrangement (29) and/or the control unit (33) is configured to determine first cutting bodies (24a) to be machined and/or removed and are disposed through the target enveloping area (HR) and which project out of the target enveloping area (HR), and
a machining device (34) configured to systematically machine and/or remove the first cutting bodies (24a) and second cutting bodies (24b).

17. The device according to claim 16,
wherein the control device (33) is further configured to specify at least one target variable (GS), which describes a cutting characteristic of the rotary tool (21) and which characterizes an individual cutting body (24) and/or a group of cutting bodies (24),
wherein the measuring arrangement (29) is further configured to determine an assigned actual variable (GI) of an individual cutting body (24) and/or a group of cutting bodies (24) for each specified target variable (GS), wherein the at least one measured actual variable (GI) is compared to the respective assigned target variable (GS) by the measuring arrangement (29) and/or the control unit (33) and a deviation (D) between the at least one measured actual variable (GI) and the respective assigned target variable (GS) is determined,
wherein the measuring arrangement (29) and/or the control unit (33) is configured to determine second cutting bodies (24) to be machined so as to reduce deviation (D) of the actual variable (GI) from the target variable (GS), when the actual variable (GI) lies outside of an admissible tolerance range (TB), and
wherein the machining device (34) is configured to systematically machine and/or remove the second cutting bodies (24b).

18. The device according to claim 16, wherein the machining device (34) comprises a laser device (35) configured to create a laser beam (L), so as to systematically machine and/or remove the first cutting bodies (24a) and the second cutting bodies (24b).

19. The device according to claim 16, wherein the measuring arrangement (29) comprises an optical measuring device (30, 32).

20. The device according to claim 19, wherein the optical measuring device comprises an incident light measuring device (32) and/or a transmitted light measuring device (30).

* * * * *